(12) United States Patent
Chipchase et al.

(10) Patent No.: US 9,344,133 B2
(45) Date of Patent: May 17, 2016

(54) CUSTOMISATION OF AN ELECTRONIC DEVICE

(75) Inventors: Jan Chipchase, Tokyo (JP); Raphael Grignani, Santa Monica, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 3067 days.

(21) Appl. No.: 10/562,566

(22) PCT Filed: Jun. 28, 2004

(86) PCT No.: PCT/IB2004/002136
§ 371 (c)(1),
(2), (4) Date: Mar. 6, 2006

(87) PCT Pub. No.: WO2005/002187
PCT Pub. Date: Jan. 6, 2005

(65) Prior Publication Data
US 2006/0148522 A1    Jul. 6, 2006

(30) Foreign Application Priority Data
Jun. 18, 2004    (GB) .................................. 0413683.4

(51) Int. Cl.
*H04W 24/00*    (2009.01)
*H04B 1/3827*    (2015.01)
(Continued)

(52) U.S. Cl.
CPC .............. *H04B 1/3833* (2013.01); *H04L 67/04* (2013.01); *H04L 67/18* (2013.01); *H04L 67/34* (2013.01); *H04M 1/72572* (2013.01);
(Continued)

(58) Field of Classification Search
CPC ....... H04W 4/02; H04W 64/00; H04W 4/025; H04W 4/023; H04W 4/18; H04W 4/20; H04W 12/02; H04W 8/26; H04W 4/001; H04W 4/021; H04W 4/022; H04W 4/027; H04L 67/18; H04L 69/329; H04L 29/06; H04L 61/06
USPC .......... 455/456.3, 456.1, 414.1, 456.2, 456.5, 455/457, 404.2, 435.1, 404.1, 412.2, 452.1, 455/466, 519, 521, 418; 709/219; 379/15.03; 370/352, 241, 338
See application file for complete search history.

(56) References Cited

U.S. PATENT DOCUMENTS 6,085,098 A    7/2000  Moon et al.
6,233,448 B1   5/2001  Alperovich et al.
(Continued)

FOREIGN PATENT DOCUMENTS

CN    1277690 A    12/2000
EP    1073298      3/2001
(Continued)

OTHER PUBLICATIONS

Japanese Office Action, Apr. 21, 2008, a total of 5 pages.
(Continued)

*Primary Examiner* — Fred Casca
(74) *Attorney, Agent, or Firm* — Squire Patton Boggs (US) LLP

(57) ABSTRACT

The operation of a mobile electronic device is controlled at least partially in accordance with operating characteristics adopted while the phone is at a first location. The operation of a mobile electronic device is controlled at least partially in accordance with a theme that defines how an electronic device responds to user input.

21 Claims, 3 Drawing Sheets

(51) Int. Cl.
*H04W 4/02* (2009.01)
*H04W 64/00* (2009.01)
*H04M 1/725* (2006.01)
*H04W 8/26* (2009.01)
*H04L 29/08* (2006.01)
*H04W 76/02* (2009.01)
*H04W 88/02* (2009.01)

(52) U.S. Cl.
CPC ............. *H04W 4/02* (2013.01); *H04W 8/26* (2013.01); *H04W 64/00* (2013.01); *H04W 76/02* (2013.01); *H04W 88/02* (2013.01)

(56) References Cited

U.S. PATENT DOCUMENTS

| | | | |
|---|---|---|---|
| 6,466,796 | B1 | 10/2002 | Jacobson et al. |
| 6,728,712 | B1* | 4/2004 | Kelley et al. .............. 707/770 |
| 7,228,141 | B2 | 6/2007 | Sethi et al. |
| 7,242,948 | B2 | 7/2007 | Fleischer et al. |
| 8,050,688 | B2 | 11/2011 | Jacob et al. |
| 2002/0026500 | A1* | 2/2002 | Kanefsky et al. ............ 709/219 |
| 2002/0028684 | A1 | 3/2002 | Kuwahra et al. |
| 2002/0046084 | A1 | 4/2002 | Steele et al. |
| 2002/0061754 | A1 | 5/2002 | Takano |
| 2002/0077080 | A1* | 6/2002 | Greene ........................ 455/412 |
| 2002/0132616 | A1 | 9/2002 | Ross et al. |
| 2002/0142792 | A1 | 10/2002 | Martinez |
| 2002/0156832 | A1* | 10/2002 | Duri et al. ..................... 709/203 |
| 2002/0193150 | A1 | 12/2002 | Pritchard |
| 2003/0008662 | A1 | 1/2003 | Stern et al. |
| 2003/0022697 | A1 | 1/2003 | Chen et al. |
| 2003/0069991 | A1 | 4/2003 | Brescia |
| 2003/0100307 | A1 | 5/2003 | Wolochow et al. |
| 2004/0058698 | A1 | 3/2004 | Crockett et al. |
| 2004/0203909 | A1 | 10/2004 | Koster et al. |

FOREIGN PATENT DOCUMENTS

| | | |
|---|---|---|
| EP | 1 217 792 | 6/2002 |
| GB | 2 352 128 | 1/2001 |
| JP | 2000-156889 | 6/2000 |
| JP | 2000-261573 A | 9/2000 |
| JP | 2001-045553 | 1/2001 |
| JP | 2001027944 A | 1/2001 |
| JP | 2002-159068 | 5/2002 |
| JP | 2002-199424 A | 7/2002 |
| JP | 2002-259011 A | 9/2002 |
| JP | 2003134220 A | 5/2003 |
| JP | 2003-163743 | 6/2003 |
| WO | WO 9921099 | 4/1999 |
| WO | WO 03/009484 | 1/2003 |
| WO | WO 03047286 A1 | 6/2003 |

OTHER PUBLICATIONS

Chinese Office Action (2004800215830), dated Feb. 15, 2008.
Japanese Office Action from Japanese Patent Application No. 2006-516584, Drafting Date: Feb. 2, 2010, Dispatch Date: Feb. 8, 2010, pp. 1-3, English Translation: pp. 1-3.
Japanese Office Action, 2006-516584, dated Mar. 30, 2009.
Canadian Office Action, Canadian Patent Application No. 2,530,669, Mailing Date: Apr. 6, 2010; pp. 1-2.
Chinese Office Action, Chinese Patent Application No. 200480021583.0, Date of Notification: Aug. 3, 2010, pp. 1-3, English Translation: pp. 1-4.
Japanese Decision of Final Rejection, Japanese Patent Application No. 2006-516584, Drafting Date: Sep. 22, 2010, Dispatch Date: Oct. 4, 2010, 1 page, English Translation: 1 page.
Japanese Decision to Dismiss an Amendment, Japanese Patent Application No. 2006-516584, Drafting Date: Sep. 22, 2010, Dispatch Date: Oct. 4, 2010, pp. 1-2, English Translation: pp. 1-2.
Canadian Office Action Corresponding to Canadian Application No. 2,530,669 dated Jun. 16, 2011 (2 pages).
Chinese Office Action, Chinese Patent Application No. 200480021583.0, Date of Notification: Dec. 28, 2010, pp. 1-3, English Translation: pp. 1-4.
European Communication pursuant to Article 94(3) EPC, European Patent Application No. 04 743 815.5-2411, Date: Mar. 7, 2011, pp. 1-3.
European Office Action dated Apr. 15, 2014, issued in corresponding Application No. EP04743815.5, 4 pages.
Sunjay Kumar Madria et al.: "Data Organization Issues for Location-dependent Queries in Mobile Computing," Report Number: 99-038, Computer Science Technical Reports, Department of Computer Science, Purdue University, Nov. 1999, pp. 1-16. Retrieved from http://docs.lib.purdue.edu/cgi/viewcontent.cgi?article=2467&context=cstech.

* cited by examiner

CUSTOMISATION OF AN ELECTRONIC DEVICE

FIELD OF THE INVENTION

Embodiments of the present invention relate to the customisation of an electronic device, such as a mobile cellular telephone.

BACKGROUND OF THE INVENTION

A diverse range of communication systems are in use today enabling communication between two or more entities, such as user equipment and/or other nodes associated with the system.

Communication systems providing wireless communication for user terminals or other nodes are known. An example of a wireless system is a public land mobile network (PLMN). A PLMN is typically a cellular network within a base transceiver station (BTS) or similar access entity user equipment (UE) such as mobile stations (MS) via a wireless interface. The operation of the apparatus required for the communication is usually controlled by one or more control entities, which themselves may be interconnected. One or more gateway nodes provide for connecting the PLMN to other networks. Examples of other such networks are other cellular networks, a public switched telephone network (PSTN) and packet switched data networks such as an IP (Internet Protocol) based network. The communication between the user equipment and other elements of the communication system are based on an appropriate communications protocol, which defines the 'rules' under which communication is handled in the system.

In a third generation (3G) wireless system, there are defined various servers for the handling of different communications services for mobile users. These include servers which provide core state control functions, known as CSCF. Control functions may also be provided by entities such as home subscriber server (HSS) and applications by various application servers. The HSS is typically for permanently storing the user's profile and use during authentication. For example, in the release 5 architecture for 3G, as specified by the third generation partnership project (3GPP), these entities can be found located within the IP multimedia subsystem (IMS).

The IMS network may sit at the hub of the 3G architecture, supporting an IP based network that handles both traditional voice telephony and multimedia services. The 3GPP has chosen session initiation protocol (SIP) as a core session signalling protocol for 3G networks. SIP has been developed by the Internet Engineering Taskforce (IETF). Those interested can find the 3GPP specification 24.229 describing the IMS network's basic operation from a SIP perspective titled 'IP Multimedia Core Control Protocol Based on SIP and SDP' at http://www.3gpp.org/ftp/specs/latest-drafts/24229-201.zip. SIP is a request/response style protocol, in the sense that for every message sent from a source, there is an associated response from the destination confirming the receipt of the sent message.

For example, in a 3G network, where a first user sourced switches on his mobile terminal, he must register his user ID or address with the network before allowing the terminal to fully connect. This is done by sending a SIP 'REGISTER' message from the terminal to the IMS, which includes details of the user's address. The IMS receives and processes this information using a serving call state control function (S-CSCF), which in this context is referred to as the 'regis- trar'. This registration information may include the status of the user such as user address, location, terminal capability and user availability. The IMS acknowledges the registration by sending a suitable acknowledge message (e.g. 200 OK message) in accordance with SIP. Subsequent registration may also take place (re-'REGISTER') whenever the preceding registration has expired, or when there is a change in the status of the user. When a user wishes to set up a session with another user, such as a voice call or sending of a text message, the session negotiation will also be performed under SIP.

Application servers (AS) may supply services via the IMS such as instant messaging, local traffic reports, and conferencing facilities. An AS may reside within the IMS network, or outside of it. Typically the AS is external when the service supported is provided by a third party. For example, an AS providing local traffic reports may need the latest information on the status of any users subscribing to that service. As noted above, status information can be updated using an SIP re-register message. The AS further requiring this status information therefore subscribes, using a SIP SUBSCRIBE message, to the REGISTER messages sent by the user subscribing to the instant messaging service offered by the AS. The IMS logs these SUBSCRIBE messages, and sends out a NOTIFY message to the AS every time a relevant REGISTER message is received. The AS can then use this information to implement its traffic reporting service. Further information on the SUBSCRIBE/NOTIFY mechanism can be found in the IETF Internet draft titled 'SIP—Specific Event Notification' which can be found at http://www.ietf.org/internet-drafts/draft-ieff-sip-events-05.txt.

One specific example of status information is presence information. Users or application servers subscribing to a presence service can determine the ability and availability of another user to accept a call. For example, in a PSTN arrangement, the concept of presence extends to little more than an indication of being on-line (ringing) or off-line (engaged). However, in systems supporting SIP presence can assume a variety of indicators such as 'in the office and available for all calls', 'at home and available for private calls only', and 'busy in call' (or at least appear that way). This presence information allows a user to ascertain the availability of another user before attempting to make a call. Like other status information as discussed above, it is relayed to the network in a REGISTER message.

The presence information although providing information allowing a user to ascertain the availability of another user before attempting to make a call, provides no assistance to the problem of context dependant information on the user equipment e.g. providing the user information relating to a local service, e.g. such as a local taxi operator. Such initially provided information is useful within a given locality but outside of their locality the information linked to this service may be incorrect or effectively useless. Service numbers that work country wide are also extremely rare, although there are some national ticket booking systems such as cinema booking these require phoning a central number and passing through a series of filtering actions before reaching a local service. Users are typically frustrated when such systems cannot deliver the local service within a short amount of time. Furthermore to the author's knowledge there are no service numbers that exist that operate on a worldwide basis.

Adjusting the operating characteristic or elements of the user equipment or mobile electronic device dependent on context have been discussed in several documents.

U.S. Pat. No. 5,479,476 describes a mobile cellular telephone that has a plurality of user adjustable operating characteristics such as the sound volume, the ringing tone type, and whether features such as key tones, warning tones, lights and call transfer are on or off. The user can adjust the operating characteristics of the phone en masse by selecting one of a plurality of groups of pre-set values for the operating characteristics.

US 2003/0017848 describes personalizing an electronic device by attaching one of a number of different interchangeable covers, each of which has its own theme. Each cover has an embedded electronic component that provides theme oriented features in the electronic device. The theme oriented features may include a ring tone, games, a screen saver, and a default voice mail greeting.

The embedded electronic component may also transfer to the electronic device names, phone numbers, resource server specifications, email addresses, and media content such as animation, audio or video. Interchanging covers of the electronic device changes the theme of the electronic device.

These documents describe the customisation of an electronic device, such as a mobile cellular telephone or other user equipment, by varying the manner of presentation by the device and the data available for use in the device.

However these documents do not discuss or address the problem of providing context dependent information for example local service information to a user travelling to different localities.

The documents further do not address the problem in mobile electronic devices, where mobile electronic devices get smaller and more feature rich, they become increasing more difficult to use. In particular, the menu of a device becomes complex and difficult to navigate. This is exacerbated when the menu is designed as a 'flat' hierarchy so that all menu options are accessible within a minimum number of keystrokes. The context dependent operation of an electronic device can help the operation of the mobile electronic device It is the aim of embodiments of the present invention to address or at least mitigate the problems described above.

BRIEF SUMMARY OF THE INVENTION

There is provided according to a first aspect of the present invention a mobile communication device for communication in a network, the device comprising: memory for storing a set of tags and for each tag an associated network address; a user interface, whereby a user can select one of the tags and thereby cause the mobile communication device to initiate a connection to the network address associated with the tag; and a configuration means arranged to automatically alter the network address associated with a tag in response to a communication received from the network.

The device may further comprise a location estimator for estimating the location of the mobile communication device, wherein said device is capable of communicating with the network to request said network to transmit a communication automatically altering the network address associated with a tag in dependence on the location estimated by the location estimator.

The user interface may have a mode whereby a user can cause the mobile communication device to transmit the said communication.

The device is preferably arranged to transmit the said communication automatically.

The device being preferably arranged to detect a service provider of the network to which it is connecting, and to transmit said communication in response to a change in the service provider.

The tag and its associated network address being preferably stored in the memory as a dynamic service card.

The network address associated with the tag may comprise at least one of: a telephone number; an email address; an uniform resource locator.

According to a second aspect of the present invention there is provided a communication network means arranged to communicate with at least one mobile communication device, said network means comprising: a memory for storing a set of tags and for each tag an associated network address; a communications means arranged to communicate with the at least one mobile communication device at least one instruction containing a tag and an associated network address.

The at least one instruction may instruct the mobile communication device to automatically alter the network address associated with a tag stored in the mobile communication device to the network address associated with a tag stored in the network means.

The network means may further comprise an additional memory, the additional memory for storing for at least some of the mobile communication devices a list of tags associated to that device and, wherein the communication means are arranged to instruct that device only to alter the network addresses associated with the tags associated with the mobile communication device identified in the list.

The network means may further comprise a mobile communication device location estimator for estimating the location of the mobile communication device, wherein the communications means are arranged to instruct the mobile communication device to automatically alter the network address associated with a tag stored in the mobile communications device dependent on the location estimated by the location estimator.

A communications system may comprise, a mobile communications device as described above, and a network means as described above.

There is provided according to a third aspect of the present invention a communication system, comprising: mobile communications devices, and a network, and in which network addresses stored in association with user selectable tags are automatically updated by one of the devices based on the devices context.

According to a fourth aspect of the present invention there is provided a mobile electronic device comprising: a memory for associating a first location with a first plurality of operating characteristics; detection means for automatically detecting when the mobile device is at the first location; adoption means for adopting the first plurality of operating characteristics when the mobile device is at the first location; and a controller, for controlling the operation of the electronic device at least partially in accordance with the adopted operating characteristics.

According to another aspect of the present invention there is provided a method of customising a mobile electronic device, comprising the steps of: associating a first plurality of operating characteristics for the mobile device with a first location; detecting the location of the mobile electronic device; adopting the first operating characteristics in the mobile electronic device when it is located at the first location; and controlling the operation of the mobile electronic device at least partially in accordance with the adopted operating characteristics.

According to a further aspect of the present invention there is provided an electronic device, having a plurality of user selectable options, comprising: a user interface having a display and a user input device; a memory for defining a first theme and a second theme, wherein the first theme defines how an electronic device is controlled by the user input to select an option when the first theme is adopted by the electronic device and the second theme defines how an electronic device is controlled by the user input to select an option when the second theme is adopted by the electronic device; selection means for selecting said first theme or said second theme for adoption by the electronic device; and a controller, for controlling the operation of the electronic device at least partially in accordance with the adopted one of the themes.

According to another aspect of the present invention there is provided a method of customising the manner in which an electronic device, having a plurality of user selectable options, is controlled by a user to select an option, comprising the steps of: providing a first theme defining how an electronic device is controlled by a user to select an option when the first theme is adopted by the electronic device; providing a second theme that defines how an electronic device is controlled by the user to select an option when the second theme is adopted by the electronic device; and selecting the first theme or the second theme for adoption by the electronic device.

According to another aspect of the present invention there is provided a mobile electronic device, having a plurality of user selectable options, comprising: a user interface having a display and a user input device; a memory for associating a first theme with a first location, wherein the first theme defines how an electronic device is controlled by the user input to select an option when the first theme is adopted by the electronic device; detection means for automatically detecting when the mobile device is at the first location; selection means for selecting said first theme for adoption by the electronic device when the mobile device is at the first location; and a controller, for controlling the operation of the electronic device at least partially in accordance with an adopted theme.

According to another aspect of the invention there is provided a method of customising the manner in which an electronic device, having a plurality of user selectable options, is controlled by a user to select an option, comprising the steps of: providing a first theme defining how an electronic device is controlled by a user to select an option when the first theme is adopted by the electronic device; detecting when the mobile electronic device is at a first location; and adopting the first theme when the mobile electronic device is located at the first location.

BRIEF DESCRIPTION OF DRAWINGS

For a better understanding of the present invention reference will now be made by way of example only to the accompanying drawings in which.

DETAILED DESCRIPTION OF EMBODIMENT(S) OF THE INVENTION

Figure 1:
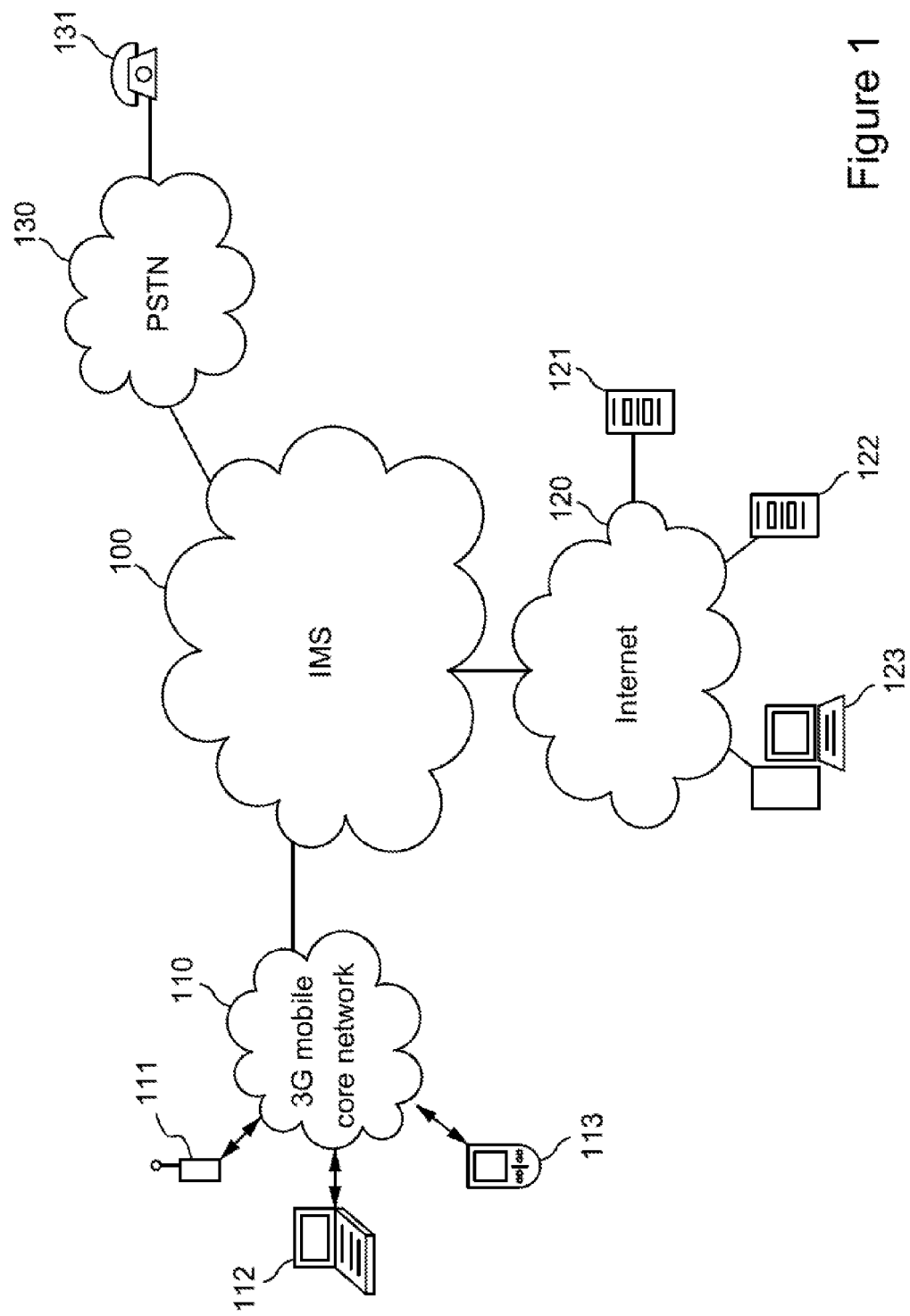
FIG. 1 illustrates a communication system wherein the present invention can be applied.

FIG. 1 illustrates a typical third generation (3G) wireless telecommunication system operating under the universal mobile telecommunication system (UMTS). At the hub of this system is the IP multimedia system (IMS) 100 network, which routes calls between two or more users of the network and provides other network functions. Examples of user equipment or mobile electronic devices, such as, a mobile terminal 111, a laptop 112, and a personal digital assistant (PDA) 113 are shown connecting to the 3G mobile core network 110. The mobile core network 110 is shown connected to the IMS system 100. The IMS system is further shown connected to a public switched telephone network (PSTN) 130. The PSTN network 130 is shown connected to a public switched telephone network telephone 131. The IMS 100 is shown connected to an IP based network such as the Internet 120. The IP network 120 is shown connected to application servers 121 and application server 122. The IP network 120 is further shown connected to a computer terminal 123.

The IMS uses an IP based network to handle these calls, which may include both voice calls and multimedia calls.

The IMS network effectively acts as a gateway in a 3G system between the users 111, 112, 113, and other networks such as a PSTN 130 and external IP based network 120. Signaling between the mobile terminal and other users of the IMS network, and within the IMS network, is done under the session initiation protocol (SIP). All references to messages that follow are SIP messages unless otherwise stated, and will be shown in capitals.

Although the communications system has been described with respect to a 3G mobile core network attached to an IMS subsystem 100, any wireless network capable of interfacing with an IP network to produce the same effect can be envisioned as being used to provide the embodiments of the present invention. Although the following examples are described in context of using a mobile station electronic device 111, the same methods can be employed by any user equipment or mobile communication device containing the same operational functionality.

Figure 2:
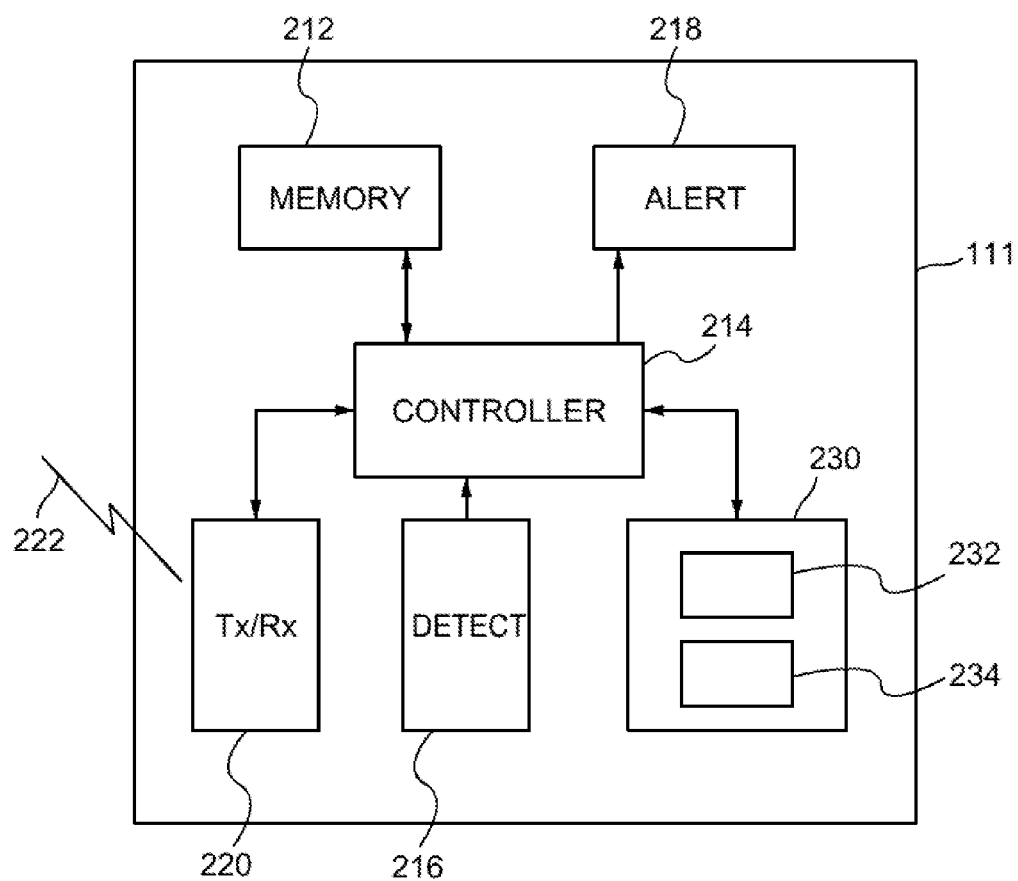
FIG. 2 illustrates an electronic device capable of operating within the communication system as shown in FIG. 1.

FIG. 2 illustrates an example of a mobile electronic device 111 that can be customized to have a particular set of operational characteristics by the adoption of a particular theme.

A theme is data and/or programming instructions defining a set of operating characteristics for the mobile electronic device. When the mobile electronic device adopts a theme it adopts the operating characteristics of that theme.

A theme may affect the form of the adopting device. 'Form' is this context means the manner of presentation by the adopting device and includes aesthetic aspects, for example, color scheme, wallpaper, screen saver and icons, and behavioural aspects, for example, the type and volume of alerts used by the device.

A theme may affect the content of the adopting device. 'Content' is this context means data available for use in the device and includes software applications, for example games, and application data, for example, reminder/calendar notes, contact information, URLs, bookmarks etc that are used in existing software applications.

A theme may affect the control of the adopting device. 'Control' in this context means how the device is controlled by the user input to select an option such as a function, setting or application. The adoption of such a control theme may for example, modify the menu structure of the device. This may improve the accessibility of particular options to a user or may add or subtract options.

The modification of the menu structure may result in a change to the hierarchical structure to the menu so that the user has to perform a first series of keystrokes to choose a particular menu option when a first theme is adopted but has to perform a second, different series of keystrokes to choose the same menu option when a second theme is adopted. Certain options that are likely to be used when the device has adopted a first theme may be promoted to a higher level in the menu structure so that they can be chosen with fewer keystrokes while other options which are unlikely to be used when the device has adopted the first theme may be demoted to a lower level of the menu structure.

The modification of the menu structure may also result in a different menu content such that the menu structures for different themes have different options available for selection by the user.

Thus applications resident in the mobile electronic device may be hidden to a user on adopting a theme by adapting the menu structure.

FIG. 2 illustrates the mobile electronic device 111, in this example a mobile cellular telephone, comprising: a memory 212, a controller 214, a location detector 216, an alert device 218, a radio transceiver 220 and a user interface 230.

The controller 214 is connected to read from and write to memory 212, It is connected to receive inputs from each of the user interface 230, the location detector 216 and the radio transceiver 220. It is connected to provide output to the user interface 230, the alert device 218 and the radio transceiver 229. The controller 214 is a programmed processor and the operation of the mobile electronic device, as described, is determined by the program instructions loaded into the processor, for example, from a computer program embodied on a record carrier.

The user interface 230 includes a display 232 and a user input device 234. The display is controlled by controller 214 to display a menu that enables the operation of the mobile electronic device 111 by a user. The menu is hierarchical structure that includes a plurality of user selectable options. The user input device 234 may be used to navigate through the hierarchical structure to find and select a desired option.

The alert device 218 is controlled by the controller 214 to gain the attention of the user. The alert device may be a loud speaker that is capable of producing ring tones or it may be a vibrator capable of vibrating the mobile electronic device 210.

The location detector 216 is capable of automatically detecting the location of the mobile electronic device. It may be, for example, a Global Positioning System (GPS) chip. Alternatively, it may determine the identification of the cell (cell ID) in which the mobile cellular telephone 111 is location from the communications received at the radio transceiver 220. The detector provides the detected position to the controller 214. The position may be a relative position such as a cell ID or an absolute position such as a grid reference.

The location detector 216 in some embodiments of the present invention determines the locality of the mobile electronic device based on the registration to a location defined network.

The memory 212 contains a database of themes. The database stores a plurality of themes including a first theme and a second theme.

The first theme defines a first set of operating characteristics for the mobile electronic device, that are adopted when the mobile electronic device 210 adopts the first theme. The second theme defines a second, different set of operating characteristics for the mobile electronic device, that are adopted when the mobile electronic device 210 adopts the second theme.

The database also stores a plurality of location identifiers including first location identifier(s) and second location identifier(s). The first and second locations are mutually exclusive.

The database has a first association between the first location identifier(s) and the first theme and a second association between the second location identifier(s) and the second theme.

An interrogation of the database using the first location identifier or one of the first location identifiers returns the first theme and an interrogation using the second location identifier or one of the second location identifiers returns the second theme.

The mobile electronic device 111 is operable to automatically adopt the first theme when the mobile electronic device 111 is at the first location and to automatically adopt the second theme when the mobile electronic device 111 is at the second location. Thus the form and/or content and/or control of the mobile electronic device 111 may be optimized for location. In particular the menu may be optimised for the location.

The controller 14 receives the location identifier from the location detector 216 and interrogates the database in the memory 212.

If the mobile electronic device 111 is located at the first location, the database returns the first theme, which is automatically adopted by the controller 214. The operation of the electronic device 111 is then controlled at least partially in accordance with the adopted operating characteristics of the first theme. If the mobile electronic device is not located at the first location, the first theme is not adopted and the default theme remains in use.

If the mobile electronic device 111 is located at the second location, the database returns the second theme, which is automatically adopted by the controller 214. The operation of the mobile electronic device 111 is then controlled at least partially in accordance with the adopted operating characteristics of the second theme. If the mobile electronic device 111 is not located at the second location, the second theme is not adopted and the default theme remains in use.

The mobile electronic device 111 is operable to automatically un-adopt an adopted theme when the mobile device leaves the location(s) associated with the presently adopted theme. The controller 214 receives the location identifier from the location detector 216 and interrogates the database in the memory 212. If the mobile electronic device 111 has, for example left the first location while adopting the first theme, the database returns a null value and the default theme is adopted replacing the first theme. If the mobile electronic device 111 has, for example left the first location while adopting the first theme and entered the second location, the database returns the second theme which is adopted replacing the first theme.

The mobile electronic device 111 may additionally or alternatively be operable to adopt a theme in response to user action instead of location. For example, a user may select one of a plurality of available themes from the menu.

The mobile electronic device 111 may additionally or alternatively be operable to adopt a theme in response to time instead of or as well as location. For example certain time periods or time frames could return a certain theme.

The radio transceiver 220 may be used to download themes to the mobile electronic device 111. The themes are downloaded as a data structure 222.

An example application of the electronic device 111 will now be described. As a user enters a fun park with a theme such as Disney World™, the user's mobile cellular telephone is either pushed with a fun park theme or is instructed to download a fun park theme. The fun park theme consists of, for example, Mickey Mouse™ wallpaper for the telephone, the signature tune from Little Mermaid™ as a ringing tone, a game including a Donald Duck™ game in which the user can win a prize and a complete schedule of the special attractions and shows available that day (and perhaps the next few days as well), and a listing of the up and coming attractions that is stored in the telephone's Calendar application. When the user exits the fun park, the telephone prompts the user whether or not to return to the telephones original theme. As a season ticket holder enters the fun park, the users telephone senses that it is entering and downloads the week's theme consisting of wallpaper, color scheme, game, reminders, ringing tone etc. As the user exits, the user is prompted whether to keep or delete the new theme. In both of these cases it is possible to have new contacts added to the telephones list of telephone numbers, either in order or at the top. These new contacts could include the 'lost and found' department, an information centre and an emergency centre. The user interface of the telephone could also be changed to make certain applications or data more accessible.

A further example of the present invention can be described with respect to the content within dynamic contact cards (DCC) or dynamic service cards (DSC). In such an example the theme is the location e.g. New York or Helsinki which affects the content of the dynamic service cards. Dynamic contact cards also known as 'Presence-Enhanced Contact' and are a service and user interface concept for sharing information among small trusted groups through availability, moods, locations, images, etc. They create mobile awareness about close contacts and make the phonebook a living reflection of their social contacts. Dynamic contact cards contain a fixed set of information decided upon by the issuer (although they can be changed by the receiver) and they are not context dependent. The set of information contained within the dynamic contact cards is limited to 40 characters of text and logo, and does not contain data fields such as phone numbers, e-mail addresses, physical addresses etc.

A dynamic service card (DSC) relates to a predetermined set of services where the display data is dependent on the context or theme. This context dependency can be location, but other embodiments of the present invention may use parameters such as language, service provider, or service intermediary. An example of a location dependent theme/context affected discrete service card is shown in FIG. 3.

Figure 3:
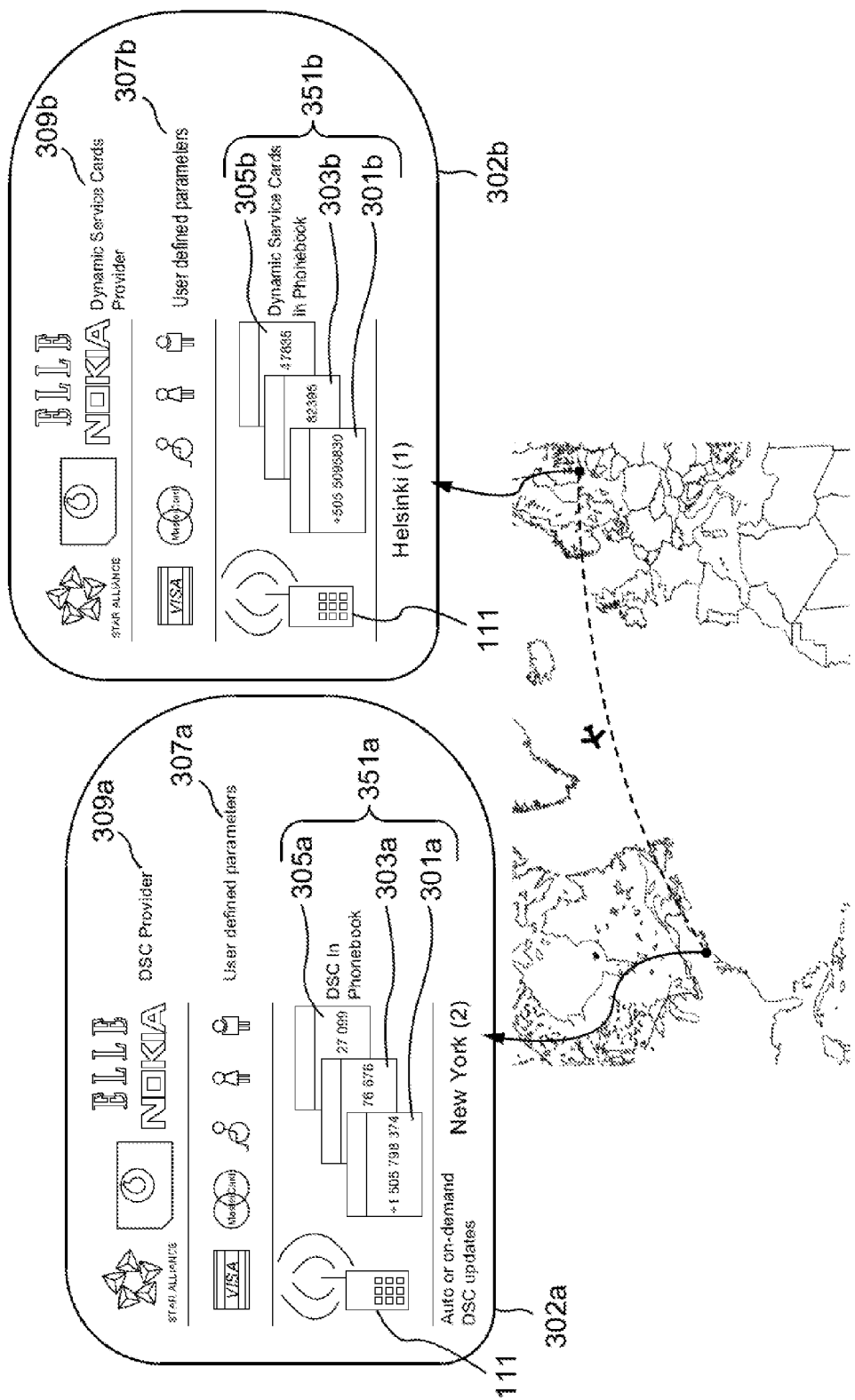
FIG. 3 illustrates the methodology of one embodiment of the present invention.

FIG. 3 shows in the embodiment of the present invention featuring dynamic service cards, also known as service contact cards. The user equipment or electronic device 111 at a location determined by the location detector 216 for this example Helsinki 302b, has downloaded using the mobile electronic device 111 radio transceiver 229 a series of dynamic service cards 351 within the phonebook of the mobile electronic device 111. The phone book is stored within the memory 212 of the mobile electronic device 111. The electronic device can be considered to have downloaded or be informed of a Helsinki themed service. Examples of dynamic service cards 351, i.e. telephone or communication channel links are those pointing to a taxi service 301, a doctor service 303, and a Visa™ credit card service 305. The dynamic service cards 351 are provided from a dynamic service card provider 309 which stores the original cards on application servers. For example organisations which may provide dynamic service cards are Vodafone™, Nokia™, Elle™, Star Alliance™.

The user or user equipment in some embodiments of the present invention selects for download various dynamic service cards 351 based on user preferences provided by the user defined parameters 307 stored within the mobile electronic device 111. These user defined parameters are in some embodiments stored within the memory 212 of the mobile electronic device 111.

Thus when a user is in a first location 302b, for example Helsinki, the user's user defined selection of taxi, doctor and Visa™ credit card services provides a local Helsinki taxi service dynamic service card 301b, a local Helsinki doctor's service dynamic service card 303b, and a local Helsinki Visa™ credit card contact dynamic service card 305b.

When a user moves out of the first location 302b to a second location 302a, in this example New York, the user finds that the data held on the predetermined set of services are no longer valid, or no longer effective. Once the device identifies its current location has changed, i.e. the location detector 216 supplies a location identifier different to that associated with the Helsinki themed dynamic service cards 351b, it automatically checks which service cards need to be updated. In some embodiments of the present invention the dynamic service card can contain a refresh identifier which requests that the controller 214 of the mobile electronic device 111 refresh the card when the correct location identifier of the card is different from the location identifier provided by the location detector 216. In such a system the mobile electronic device 111 contacts an application server as the IMS system via the radio transceiver 229 to obtain an updated dynamic service card 351 containing the location identifier's theme whenever the mobile electronic device 111 is outside of the dynamic service cards location identifier. For example the direct service card 301 relating to the Helsinki taxi service is no longer valid as the user is in New York. The mobile electronic device 111 therefore requests and accesses a dynamic service card for a local taxi company in the new locality of New York. Thus the dynamic service card relating to the taxi service 301 is now a New York taxi service dynamic service card 301a. When the user returns to his first location 302b a similar process is carried out wherein the New York taxi service dynamic service card 301a is declared invalid causing the user equipment to request an update to the taxi service provider within the locality.

In some embodiments of the present invention the user of the mobile electronic device 111 actively accesses the service card for a local taxi company, which prompts the card to request updated information for a suitable service company. Thus in the above example of a user travelling from Helsinki to New York, having a Helsinki taxi service card 301b stored in the memory 212 of mobile electronic device 111, could request a local, i.e. New York taxi service card 301a.

In a further embodiment of the present invention a company/organisation may wish to provide to its employees useful information, such as a local emergency insurance number (IM number), the local company/organisation office, and approved hotels in whichever locality they are currently within. In such an embodiment the mobile electronic device 111 is supplied with such information by the employer. Thus an employer maintains the information on an application server which is supplied as a series of location or otherwise based themes to the employees mobile devices.

In further embodiments of the present invention the user may be pre-supplied with a database containing the dynamic service cards for many of the themes. In such an embodiments for example the mobile electronic device 111 does not require to access the server to download any further dynamic service cards in order to select which dynamic service card to use in most situations as the options are selected from the cached versions stored within the mobile electronic device 111. For example a employer may pre-supply a mobile electronic device 111 with sufficient dynamic service cards before the employee depart on a business trip. Thus the employee need not make calls to the network to request new dynamic service cards and thus reduce the cost of the trip to the employer.

The user in some embodiments of the present invention can further define a service card for particular interest areas using their user defined parameters 307. For example the user of mobile electronic device 111 can select a service card for a garage for a Citroën car, which selects from an application server a service card provided by an operator representing that interest area for example, the Citroën cars owners' club.

Furthermore the user may decide to subscribe to a set of service contact cards from a particular organisation. For example the user may with to subscribe to cards from the French Foreign Ministry, the UN, Greenpeace™, or companies such as Visa™, Star Alliance™ or Elle™ magazine.

Users may also wish to store service contact cards for a particular company such as Starbucks, Prada, Timeout, Kinko's, Finnair Service Desk. In this instance the information source is maintained by those companies. In other embodiments of the present invention the information source is maintained by these companies on third party or broker servers. In these embodiments the information could be encrypted on the broker server in order that the information is unreadable to the broker company. The user would be supplied a key to decrypt the information on the encrypted card.

In some embodiments of the present invention the user stores in their user defined parameters a series of subscribed user service card values. In such an embodiment an access server on noticing a user entering their geographical area is able to request the user defined parameter subscribed values, and downloads or updates all of the cards on the subscribed list from the application server memory.

In some embodiments of the present invention the user may wish to preload information for their intended destination to review prior to arriving. Therefore in some embodiments of the present invention the user may request a new themed set of service cards without requiring the location detector 216 input. In other embodiments of the present invention the user may select new dynamic service cards based on themes other than location, such as language, or service provision or services intermediates.

In the above described embodiments using service cards the advantage is that the theme based dynamic service cards increase the usage and relevance of the handset. Furthermore the information is carrier friendly, in such that the information is not service provider dependent. Furthermore the information is a smart extension of how users currently manage their contacts and therefore does not require the user to learn a completely new system. The system furthermore hides context irrelevant information from the user.

The embodiments also build on known brands who already wish to provide this service and users benefit from using the trusted partners or networks or services.

In further embodiments of the present invention where the theme is a time theme the electronic device can download or be informed of a time themed service. For example a 'before 3 pm' themed dynamic service cards could indicate that a service desk to be contacted is service desk 'A' before 3 pm, and an 'after 3 pm' themed dynamic service card could indicate that the service desk to be contacted is service desk 'B' after 3 pm.

In further embodiments of the present invention where the theme is both time and location oriented the electronic device can download or be informed of a time/location themed service. For example a 'before 3 pm in Italy' themed dynamic service card could indicate that a service desk to be contacted is service desk 'Italy A' and an 'after 3 pm in Italy' themed dynamic service card could indicate that a service desk to be contacted is service desk 'Italy B'.

In some embodiments of the present invention the user operating the mobile electronic device can select or receive several theme cards from the server then select one of the received cards to store. In other embodiments of the present invention the user can discard the supplied theme contact card. In such an embodiment where the user discards one of the cards the mobile electronic device can download or be informed of further cards within the users selected parameters.

Although embodiments of the present invention have been described in the preceding paragraphs with reference to various examples, it should be appreciated that modifications to the examples given can be made without departing from the spirit and scope of the invention.

The invention claimed is:

1. An apparatus, comprising:
at least one processor and at least one memory including computer program code, the at least one memory and the computer program code configured to, with the at least one processor, cause the apparatus to
store a set of tags and for each tag, store an associated network address, wherein each tag corresponds to a service and wherein the associated network address corresponds to a service provider of the service,
provide a user interface that enables a user to select one of the tags and cause the apparatus to initiate a connection to the network address associated with the tag,
estimate the location of the apparatus,
communicate with the network to request that the network transmit a communication that automatically alters the network address associated with a tag in dependence on the estimated location, and
automatically alter the network address associated with the tag in response to the communication received from the network.

2. An apparatus as claimed in claim 1, wherein the user interface has a mode where a user can cause the apparatus to communicate with the network to request transmission of the communication automatically altering the network address associated with the tag.

3. An apparatus as claimed in claim 2, wherein the at least one memory and the computer program code are further configured to, with the at least one processor, cause the apparatus at least to communicate with the network automatically.

4. An apparatus as claimed in claim 3, wherein the at least one memory and the computer program code are further configured to, with the at least one processor, cause the apparatus at least to detect a service provider of the network to which the apparatus is connecting, and to communicate with the network in response to a change in the service provider.

5. An apparatus as claimed in claim 1, wherein the tag and its associated network address are stored in the memory as a dynamic service card.

6. An apparatus as claimed in claim 1, wherein the network address associated with the tag comprises at least one of:
a telephone number;
an email address; or
a uniform resource locator.

7. An apparatus, comprising:
at least one processor and at least one memory including computer program code, the at least one memory and the computer program code configured to, with the at least one processor, cause the apparatus at least to
store a set of tags and for each tag, store an associated network address, wherein each tag corresponds to .a service and wherein the associated network address corresponds to a service provider of the service, and
communicate at least one instruction containing a tag and an associated network address with at least one mobile communication terminal, wherein the at least one mobile communication terminal is configured to communicate with the apparatus to request that the apparatus transmit a communication that automatically alters the network address associated with a tag in dependence on the estimated location.

8. An apparatus as claimed in claim 7, wherein the at least one instruction instructs the mobile communication terminal to automatically alter a network address associated with a tag stored in the mobile communication terminal to the network address associated with a tag stored in the apparatus.

9. An apparatus as claimed in claim 7, wherein the at least one memory and the computer program code are further configured to, with the at least one processor, cause the apparatus at least to store a list of associated tags for one or more of the at least one mobile communication terminal, wherein
the apparatus is configured to instruct the one or more of the at least one mobile communication terminal only to alter the network addresses associated with the tags associated with the mobile communication terminal identified in the list.

10. A method, comprising:
storing a set of tags and for each tag, storing an associated network address, wherein each tag corresponds to a service and wherein the associated network address corresponds to a service provider of the service;
providing a user interface that enables a user to select one of the tags and cause a mobile communication terminal to initiate a connection to the network address associated with the tag;
estimating the location of the mobile communication terminal;
communicating with the network to request that the network transmit a communication that automatically alters the network address associated with a tag in dependence on the estimated location; and
automatically altering the network address associated with the tag in response to the communication received from the network.

11. A method as claimed in claim 10, further comprising:
estimating the location of the mobile communication terminal, wherein
the mobile communication terminal is configured to communicate with the network to request the network to transmit a communication automatically altering the network address associated with a tag in dependence on the location estimated by the mobile communication terminal.

12. A method as claimed in claim 11, wherein the user interface has a mode where a user can cause the apparatus to communicate with the network to request transmission of the communication automatically altering the network address associated with the tag.

13. A method as claimed in claim 12, wherein the mobile communication terminal communicates with the network automatically.

14. A method as claimed in claim 13, further comprising:
detecting a service provider of the network to which the mobile communication terminal is connecting, and to communicate with the network in response to a change in the service provider.

15. A method as claimed in claim 10, wherein the tag and its associated network address are stored as a dynamic service card.

16. A method as claimed in claim 10, wherein the network address associated with the tag comprises at least one of:
a telephone number;
an email address; or
a uniform resource locator.

17. A method, comprising:
storing a set of tags and for each tag, storing an associated network address, wherein each tag corresponds to a service and wherein the associated network address corresponds to a service provider of the service; and
communicating at least one instruction containing a tag and an associated network address with at least one mobile communication terminal, wherein
the at least one mobile communication terminal is configured to communicate with a network to request that the network transmit a communication that automatically alters the network address associated with a tag in dependence on the estimated location.

18. A method as claimed in claim 17, wherein the at least one instruction instructs the mobile communication terminal to automatically alter a network address associated with a tag stored in the mobile communication terminal to the network address associated with a tag stored in a network element.

19. A method as claimed in claim 17, further comprising:
storing a list of associated tags for one or more of the at least one mobile communication terminal, and
instructing the one or more of the at least one mobile communication terminal only to alter the network addresses associated with the tags associated with the mobile communication terminal identified in the list.

20. A computer program embodied on a non-transitory computer-readable storage medium, the program configured to control a processor to:
store a set of tags and for each tag, store an associated network address, wherein each tag corresponds to a service and wherein the associated network address corresponds to a service provider of the service;
provide a user interface that enables a user to select one of the tags and cause a mobile communication terminal to initiate a connection to the network address associated with the tag;
estimate the location of the mobile communication terminal;
communicate with the network to request that the network transmit a communication that automatically alters the network address associated with a tag in dependence on the estimated location; and
automatically alter the network address associated with the tag in response to the communication received from the network.

21. A computer program embodied on a non-transitory computer-readable storage medium, the program configured to control a processor to:
store a set of tags and for each tag, store an associated network address, wherein each tag corresponds to a service and wherein the associated network address corresponds to a service provider of the service; and
communicate at least one instruction containing a tag and an associated network address with at least one mobile communication terminal, wherein
the at least one mobile communication terminal is configured to communicate with a network to request that the network transmit a communication that automatically alters the network address associated with a tag in dependence on the estimated location.

* * * * *